United States Patent
Stultz et al.

(10) Patent No.: US 7,974,199 B2
(45) Date of Patent: *Jul. 5, 2011

(54) ADAPTIVE BANDWIDTH UTILIZATION FOR TELEMETERED DATA

(75) Inventors: Robert D. Stultz, Melbourne, FL (US); Bradford L. Kizzort, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 191 days.

This patent is subject to a terminal disclaimer.

(21) Appl. No.: 12/432,797

(22) Filed: Apr. 30, 2009

(65) Prior Publication Data

US 2009/0207734 A1    Aug. 20, 2009

Related U.S. Application Data (63) Continuation of application No. 10/948,035, filed on Sep. 23, 2004, now Pat. No. 7,782,789.

(51) Int. Cl.
   *H04L 12/26* (2006.01)
(52) U.S. Cl. ...................................................... 370/232
(58) Field of Classification Search ................. None
   See application file for complete search history.

(56) References Cited

U.S. PATENT DOCUMENTS

| | | | |
|---|---|---|---|
| 5,367,523 A | 11/1994 | Chang et al. | |
| 5,627,970 A | 5/1997 | Keshav | |
| 5,949,758 A | 9/1999 | Kober et al. | |
| 6,048,366 A | 4/2000 | Ellis et al. | |
| 6,212,201 B1 | 4/2001 | Hinderks et al. | |
| 6,256,602 B1 | 7/2001 | Ellis et al. | |
| 6,343,085 B1 | 1/2002 | Krishnan et al. | |
| 6,404,776 B1 | 6/2002 | Voois et al. | |
| 6,445,681 B1 | 9/2002 | Pogrebinsky | |
| 6,490,249 B1 | 12/2002 | Aboul-Magd et al. | |
| 6,563,517 B1 | 5/2003 | Bhagwat et al. | |
| 6,577,648 B1 | 6/2003 | Raisanen et al. | |
| 6,618,385 B1 | 9/2003 | Cousins | |
| 6,665,733 B1 | 12/2003 | Witkowski et al. | |
| 6,807,173 B1 | 10/2004 | Lee et al. | |
| 6,937,568 B1 * | 8/2005 | Nicholl et al. | 370/236 |
| 7,035,220 B1 * | 4/2006 | Simcoe | 370/236 |
| 7,310,309 B1 * | 12/2007 | Xu | 370/230.1 |
| 7,423,972 B2 * | 9/2008 | Shaham et al. | 370/236 |

(Continued)

FOREIGN PATENT DOCUMENTS

JP        2003174664 A     6/2003

(Continued)

*Primary Examiner* — Anh-Vu Ly (74) *Attorney, Agent, or Firm* — Fox Rothschild, LLP; Robert J. Sacco (57) ABSTRACT

A method (400) for optimizing bandwidth utilization in a communications network (100). The communications network can include a data source (105) and a data client (110). Responsive to a measurement of at least one communication parameter (120) of a commutated bitstream (115) which is transmitted to the client, the data source can change a commutation format of the commutated bitstream. The communication parameters can include a data receive time ($T_{Rx}$), a data latency and/or an effective receive data rate ($D_{Eff}$) of the commutated bitstream. The communication parameters can be transmitted to the data source as telemetry. The change of commutation format can occur in an open systems interconnection (OSI) layer such as a session layer and/or a transport layer.

12 Claims, 4 Drawing Sheets

U.S. PATENT DOCUMENTS

| | | |
|---|---|---|
| 7,782,789 B2 * | 8/2010 | Stultz et al. .................. 370/252 |
| 2002/0021669 A1 | 2/2002 | Kunito et al. |
| 2002/0131443 A1 | 9/2002 | Robinett et al. |
| 2003/0079041 A1 | 4/2003 | Parrella et al. |
| 2003/0198184 A1 * | 10/2003 | Huang et al. .................. 370/231 |
| 2004/0190449 A1 | 9/2004 | Mannal et al. |
| 2004/0243721 A1 | 12/2004 | Stultz et al. |
| 2005/0220035 A1 | 10/2005 | Ling et al. |
| 2007/0127488 A1 | 6/2007 | Futenma et al. |

FOREIGN PATENT DOCUMENTS

| | | |
|---|---|---|
| WO | WO-0155874 | 8/2001 |

* cited by examiner

ADAPTIVE BANDWIDTH UTILIZATION FOR TELEMETERED DATA

CROSS REFERENCE TO RELATED APPLICATIONS

The present application is a continuation of U.S. patent application Ser. No. 10/948,035 filed Sep. 23, 2004.

BACKGROUND OF THE INVENTION

1. Statement of the Technical Field

The inventive arrangements relate to the field of data propagation, and more particularly, to bandwidth utilization of a data bitstream.

2. Description of the Related Art

Network bandwidth is a critical resource in large communications systems. Assuming that all other parameters are equal, the amount of data that can be propagated in a particular communications system is proportional to the available network bandwidth. The available network bandwidth can change, however, due to a variety of factors such as loss of service, signal obstruction and jamming.

In some communications systems data is prioritized and a server is tasked with providing a minimum bandwidth to data that is designated a high priority status in an attempt to guarantee a minimum level of quality of service (QoS) for the high priority data. QoS is typically measured in terms of average delay, variation in delay, and transmission error rate for the data being transmitted. Unfortunately, maintaining the minimum bandwidth for the high priority data oftentimes results in reallocating to the high priority data bandwidth that was assigned for other data communications within the network.

Bandwidth reallocation schemes are typically based on policy and reservation criteria arranged in advance. Such schemes are known to cause transmission errors for the other data communications and significant data loss can occur. In some instances, for example in tactical command and control systems, such communication errors are highly undesirable; data which is not assigned highest priority may, nonetheless, still be critical. Accordingly, a solution is needed to reduce loss of data in communications systems in which the available network bandwidth may vary.

SUMMARY OF THE INVENTION

The present invention concerns a method for optimizing bandwidth utilization in a communications network. Responsive to a measurement of at least one communication parameter (communication parameters) of a commutated bitstream which is transmitted to a data client, a commutation format of the commutated bitstream can be changed. The change of format can occur in an open systems interconnection (OSI) layer such as a session layer and/or a transport layer. The communication parameters can include a data receive time ($T_{Rx}$), a data latency and/or an effective receive data rate ($D_{Eff}$) of the commutated bitstream. The communication parameters can be transmitted from the data client to a data source as telemetry.

In one arrangement, the data receive time ($T_{Rx}$) can be compared to a data transmit time ($T_{Tx}$) to determine the data latency. Based on the data latency, a new commutation format definition can be selected and the commutated bitstream can be formatted in accordance with the new commutation format definition. This step can include comparing the data latency to a reference latency value.

In another arrangement, the effective receive data rate ($D_{Eff}$) can be compared to a transmit data rate ($D_{Tx}$) to determine a data rate difference. Based on the data rate difference, a new commutation format definition can be selected. In yet another arrangement, a new commutation format definition can be based on both the data latency and the data rate difference and, based on these parameters, the new commutation format definition can be selected.

The invention also concerns a data source including a commutation engine that changes the commutation format of the commutated bitstream being transmitted to the data client responsive to receiving communication parameters from the data client. Again, the communication parameters can include the data receive time ($T_{Rx}$), the data latency, and/or the effective receive data rate ($D_{Eff}$) of the commutated bitstream. The commutation engine can select a new commutation format definition based on the data latency and can format the commutated bitstream with the new commutation format definition. For example, the commutation engine can compare the data latency to a reference data latency value to select the commutation format definition. In another arrangement, the commutation engine can compare the effective receive data rate ($D_{Eff}$) to the transmit data rate ($D_{Tx}$) to determine a data rate difference. Based on the data rate difference, the commutation engine can select a new commutation format definition and format the commutated bitstream with the new commutation format definition. In yet another arrangement, the commutation engine can select a new commutation format definition based on the data latency and the data rate difference.

The present invention also concerns a communications network that includes the data source comprising a commutation engine and a data client comprising a decommutation engine. The data client can measure communication parameters of the commutated bitstream received from the data source and transmit the communication parameters to the data source as communication parameters. The communication parameters can be, for example, transmitted as telemetry. The data source then can select a new commutation format definition and change the commutation format of the commutated bitstream.

DETAILED DESCRIPTION OF THE PREFERRED EMBODIMENTS

An embodiment in accordance with the present invention relates to a system and a method for providing adaptive and predictable bandwidth utilization when transmitting data with a commutated bitstream. When the data is received by a data client from a data source, parameters associated with the data transmission, for example the receive time and the effective receive data rate, can be measured and propagated back to the data source as communication parameters. In one arrangement, the communication parameters can be propagated to the data source as telemetry.

The data source can evaluate the measured parameters to determine whether the commutation format of the commutated bitstream is optimal. If the commutated bitstream is not optimally formatted, a different commutation format can be implemented. Notably, the new commutation format can be selected to utilize less bandwidth when the measured parameters indicate that less bandwidth is available, or utilize more bandwidth when the measured parameters indicate that more bandwidth is available. Accordingly, the present invention can dynamically adjust bandwidth usage in a predictable manner to optimize data transfer during changing network conditions.

Notably, the data transfer optimization process of the data source can be implemented in an open systems interconnection (OSI) layer that is above the network layer. For instance, the data transfer optimization process can be implemented in a session layer and/or in a transport layer. Thus, the present invention is independent of the network protocol or network hardware that is being used, and therefore can be implemented in existing communications networks without requiring changes to the network hardware or software.

Figure 1:
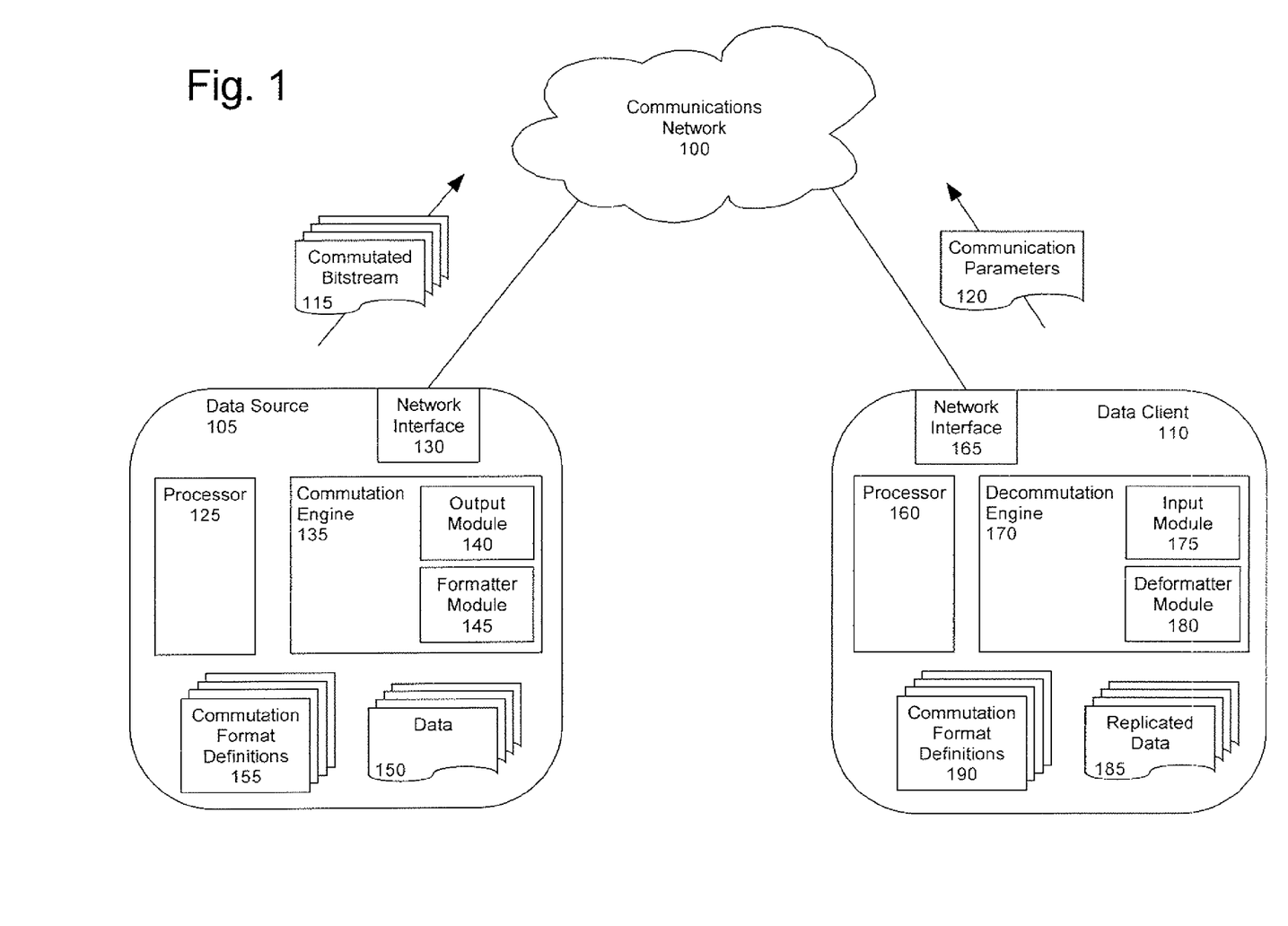
FIG. 1 is a diagram of a communications network which is useful for understanding the present invention.

An example of a communications network 100 which is useful for understanding the present invention is depicted in FIG. 1. The communications network 100 can comprise a wide area network (WAN), a local area network (LAN), a telemetry system, a public switched telephone network (PSTN), a public switched data network (PSDN), an intranet, the Internet, a mobile radio communications network, a cellular telephone communications network, and/or any other suitable communications network.

A data source 105 and a data client 110 can be communicatively connected as nodes of the communications network 100. The data source 105 can be a processing device operatively connected to the communications network 100 and which can propagate a commutated bitstream 115 to the data client 110. Similarly, the data client 110 can be a processing device operatively connected to the communications network 100 which can receive the commutated bitstream 115 from the data source 105. In response, the data client 110 can generate communication parameters 120 associated with the data transmission and transmit the communication parameters 120 to the data source 105.

The data source 105 and the data client 110 each can be computers such as servers, workstations, personal computers, portable computers, application specific processing systems, or any other devices or systems which can communicate using a commutated bitstream. Further, the data source 105 and the data client 110 each can include a respective processor 125, 160. The processors 125, 160 can be central processing units (CPUs), digital signal processors (DSPs), application specific integrated circuits (ASICs), or any other suitable processors. By way of example, the data source 105 and/or the data client 110 can be components of emergency response systems, battlefield management systems, satellite systems, security systems, transportation systems, health monitoring systems, environment monitoring systems, energy supply systems, communications systems, or any other systems in which available bandwidth may vary.

The data source 105 can include a network interface 130 for transmitting and receiving data. The network interface 130 can be, for example, a modem or transceiver. Modems and transceivers are well known to the skilled artisan. In particular, the network interface 130 can transmit the commutated bitstream 115 and receive the communication parameters 120 via the communications network 100. The commutated bitstream 115 can be transmitted using any suitable messaging protocol. Such messaging protocols are also known to the skilled artisan.

The data source 105 also can include a commutation engine 135 which generates the commutated bitstream 115. The commutation engine 135 can comprise an output module 140 and a formatter module 145. The formatter module 145 can place data 150 into the commutated bitstream 115 in accordance with commutation format definitions 155. The output module 140 can apply appropriate messaging protocols to communicate the commutated bitstream 115 over the communications network 100.

As defined herein, a commutated bitstream is a serial stream of data containing a plurality of interspersed data items. The commutated bitstream 115 can be organized in accordance with one or more commutation format definitions 155 which define the structure of the commutated bitstream 115. The commutation format definitions 155 can, for example, define what data items to include in the commutated bitstream 115, define sampling rates to be used for the data items, define the position of the data items in the commutated bitstream 115, define how many bits are allocated for each data item, and/or define any other bitstream parameters. Further, the commutation format definitions 155 can provide conditional formatting. For instance, the commutation format definitions 155 can include Boolean logic and/or conditional statements.

The commutation format definitions 155 can be contained in a data store contained within, or communicatively linked to, the data source 105. The data store can be, for example, an electronic storage medium, an optical storage medium, a magnetic storage medium, a magneto-optical storage medium, or any other type of storage medium which can store data. In one arrangement, the commutation format definitions 155 can be contained in data tables. However, the invention is not limited in this regard. For instance, the commutation format definitions 155 can be stored as data files, text files, or in any other suitable manner. Further, the commutation format definitions 155 can be replaced, appended or deleted, and new commutation format definitions can be added to change available commutation format options.

The data client 110 can include a network interface 165 for transmitting and receiving data. The network interface 165 can be used to receive the commutated bitstream 115 and transmit the communication parameters 120. The data client 110 also can include a decommutation engine 170 which decommutates the commutated bitstream 115 to produce replicated data 185. The decommutation engine 170 can comprise an input module 175 and a deformatter module 180. The input module 175 can receive the commutated bitstream 115 and translate the commutated bitstream 115 to remove messaging protocol information.

The deformatter module 180 can parse data 150 from the commutated bitstream 115 in accordance with commutation format definitions 190. The commutation format definitions 190 can correlate to the commutation format definitions 155. For example, the commutation format definitions 190 can be similar or identical to the commutation format definitions 155. Again, the commutation format definitions 190 can be contained in a data store.

The deformatter module 180 can analyze the commutated bitstream 115 to select an appropriate commutation format definition 190. For example, the deformatter module 180 can parse one or more commutation format identifiers from the commutated bitstream 115. The commutation format identifiers can be contained in packet (or frame) headers, trailers, or any other suitable locations within the commutated bitstream 115.

Other details of the commutation and decommutation engines and associated modules and functions are disclosed in commonly assigned U.S. Pat. Nos. 6,048,366 and 6,256,602, commonly assigned U.S. patent application Ser. No. 10/445,540 filed May 27, 2003, and commonly assigned International Patent Application No. WO 01/55874, the disclosures of which are hereby incorporated by reference in their entirety. In the case of conflict the present specification, including definitions, will control.

In operation, the data source 105 can transmit the commutated bitstream 115 to the data client 110 via the communications network 100. The data client 110 can measure parameters associated with the transmission of the commutated bitstream 115 and transmit the measured parameters to the data source 105 as the communication parameters 120. In one arrangement, the communication parameters 120 can be transmitted as telemetry.

The measured parameters can include the data receive time ($T_{Rx}$), the data latency, and/or the effective receive data rate ($D_{Eff}$) of the commutated bitstream 115 transmission. Such parameters can be measured by the data client 110 using any suitable processes and/or components known to those skilled in the art. For example, the network interface 165 and/or the decommutation engine 170 can measure the effective receive data rate ($D_{Eff}$). The processor 160 and data client system time clock (not shown) can be used to time stamp the receive time ($T_{Rx}$) of data that is received by the data client 110. This data receive time ($T_{Rx}$) can be compared to data transmit time ($T_{Tx}$), which can be included as a time stamp in the commutated bitstream 115, to determine the data latency. The comparison of the data receive time ($T_{Rx}$) to the data transmit time ($T_{Tx}$) can be performed by the data client's processor 160, which is an actual rate at which the data client 110 receives data.

Alternatively, the data receive time ($T_{Rx}$) can be received by the data source 105 in the communication parameters 120 and the data source 105 can determine the data latency using the processor 125 and a suitable process. Additionally, the data source 105 can receive the effective receive data rate ($D_{Eff}$) in the communication parameters 120 and compare the effective receive data rate ($D_{Eff}$) to the transmit data rate ($D_{Tx}$) of the commutated bitstream 115 to determine a data rate difference. As defined herein, the term "data rate difference" means a difference between the effective receive data rate ($D_{Eff}$) and the transmit data rate ($D_{Tx}$) of the commutated bitstream 115. The transmit data rate ($D_{Tx}$) can be measured by the data source's network interface 130 and/or the commutation engine 135. The data rate difference can be used to identify any data dropped by the network during transmission from the data source 105 to the data client 110.

In yet another arrangement, the data receive time ($T_{Rx}$), data transmit time ($T_{Tx}$), transmit data rate ($D_{Tx}$) and/or effective receive data rate ($D_{Eff}$) can be propagated to another processing device or system (not shown). The other processing device or system then can evaluate such parameters to determine the data latency and/or the data rate difference and communicate this information to the data source 105. Still, other methods can be implemented to determine the data latency and the data rate difference, and the invention is not limited in this regard.

The data source 105, data client 110, or other system can process the data latency and/or data rate difference to determine whether the commutation format of the commutated bitstream 115 is optimal. If the commutated bitstream 115 is not optimally formatted, the commutation engine 135 can implement a different commutation format. As noted, the new commutation format can be selected to utilize less bandwidth when the measured parameters indicate that less bandwidth is available, or utilize more bandwidth when the measured parameters indicate that more bandwidth is available. For example, if the data latency is high and/or the effective receive data rate ($D_{Eff}$) is lower than the transmit data rate ($D_{Tx}$), this would indicate that the data source 105 is transmitting the commutated bitstream 115 at a data rate which is too high for the bandwidth that is available in the communications network 100. Conversely, if the data latency is low and/or the effective receive data rate ($D_{Eff}$) is equal to or higher than the transmit data rate ($D_{Tx}$), this would indicate that the data source 105 is transmitting the commutated bitstream 115 at a data rate which is not using all of the available bandwidth. Thus, a commutation format definition 155 can be selected to reduce or increase the amount of bandwidth that is being used to transmit the commutated bitstream 115.

In one arrangement, the effective receive data rate ($D_{Eff}$) and/or the data latency can be evaluated to estimate the available bandwidth. For instance, algorithms can be executed to determine the available bandwidth based on these parameters. Alternatively, look up tables can be provided which correlate such information to available bandwidth.

The commutation format definition 155 can be selected based on the estimated available bandwidth. For example, each commutation format definition 155 can be provided with an indicator that indicates when the respective commutation format definitions 155 should be used. For instance, the indicators can indicate the minimum and/or maximum available bandwidth with which the respective commutation format definitions 155 should be used. The respective indicators can be accessed to select the optimal commutation format definition 155 each time a minimum amount of change in available bandwidth has occurred and/or at periodic intervals.

In an embodiment in which the data client 110 or other system makes the determination as to whether the commutation format of the commutated bitstream 115 is optimal, the data client 110 (or other system) can send a request to data source 105 to indicate that a new commutation format definition 155 should be selected. In an embodiment in which the data source 105 makes the determination as to whether the commutation format of the commutated bitstream 115 is optimal, the data source 105 can select a new commutation format definition 155.

Figure 2:
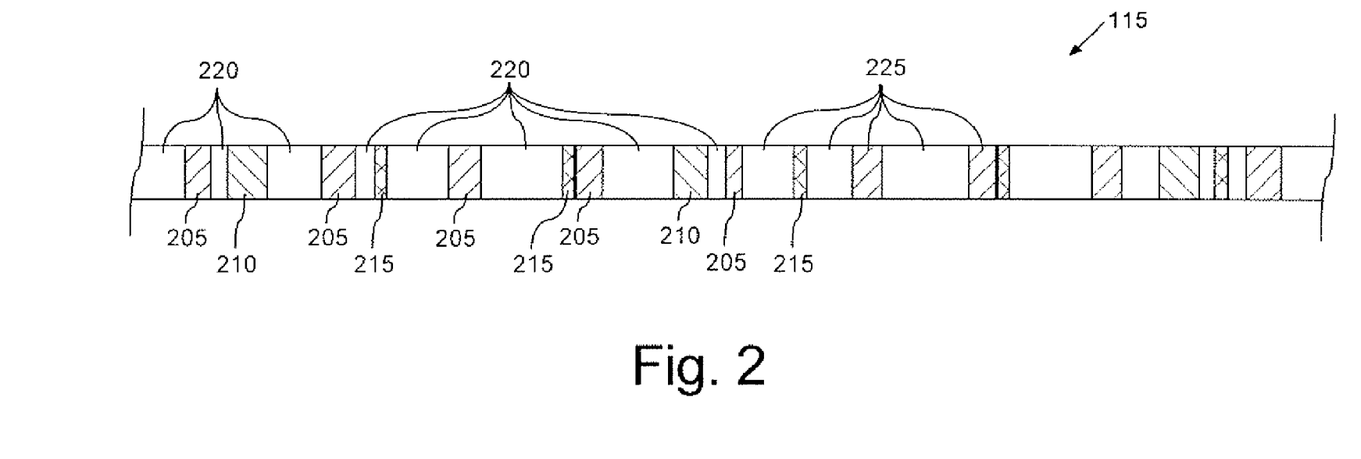
FIG. 2 is a diagram illustrating a serial bitstream data format which is useful for understanding the present invention.

Data items which are transmitted in the commutated bitstream 115 can be prioritized so that certain data items are allocated a minimum number of time slots for a given period of time in each respective commutation format. Thus, if the available bandwidth decreases, data that is given high priority can still be transmitted at a desired transmission rate while lower priority data can be transmitted at a lower transmission rate. Referring to FIG. 2, a diagram is shown which illustrates an example of the commutated bitstream 115 formatted with a first commutation format definition optimized for a given available bandwidth. As shown, the commutated bitstream 115 contains a plurality of data items which are transmitted in time slots 225. For example, the commutated bitstream 115 can contain a first data item 205, a second data item 210, a third data item 215, and other data items 220.

Figure 3:
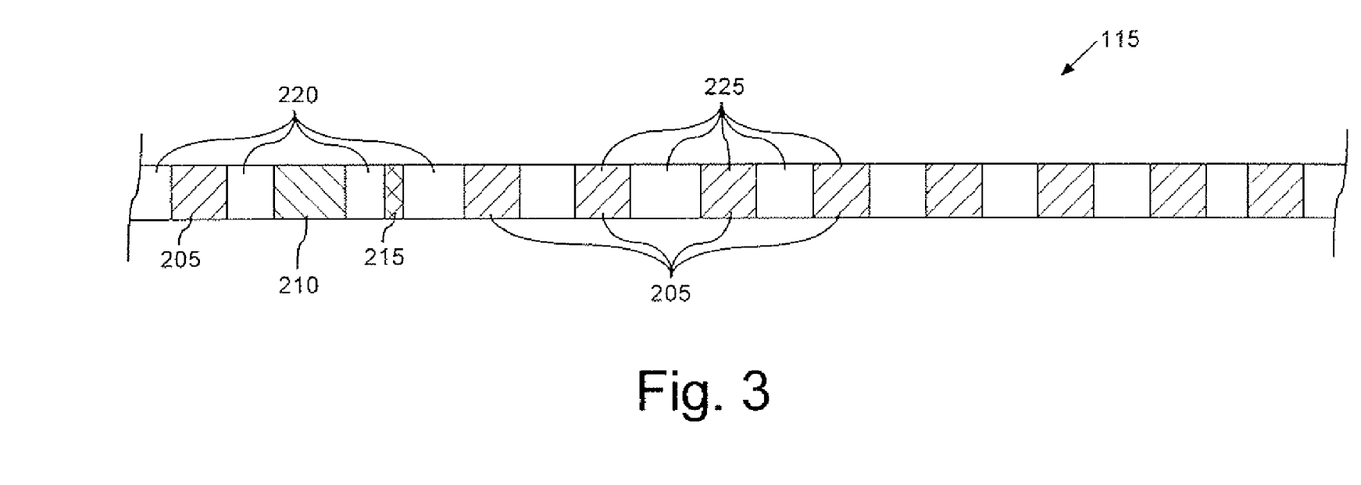
FIG. 3 is a diagram illustrating another serial bitstream data format which is useful for understanding the present invention.

Referring to FIG. 3, a diagram is shown of an example of the commutated bitstream 115 formatted in accordance with a second commutation format definition. The second commutation format definition can be selected should the available bandwidth decrease. In this example, the first data item 205 has been given a high priority status, while the second, third and fourth data items 210, 215, 220 have not. Even though use of the second commutation format definition has decreased the baud rate of the commutated bitstream 115, the number of time slots 225 that are allocated to the first data item 205 have not changed. Accordingly, the change in available bandwidth will have little effect on the transfer of the first data item 205.

In this example, only a single data item was assigned high priority status, but the invention is not limited in this regard. Importantly, multiple priority levels can be established and any number of data items—or none at all—can be assigned to each priority level. The number of time slots allocated to each data item can be determined based on the transmission baud rate and the number of data items assigned to each priority level.

Figure 4:
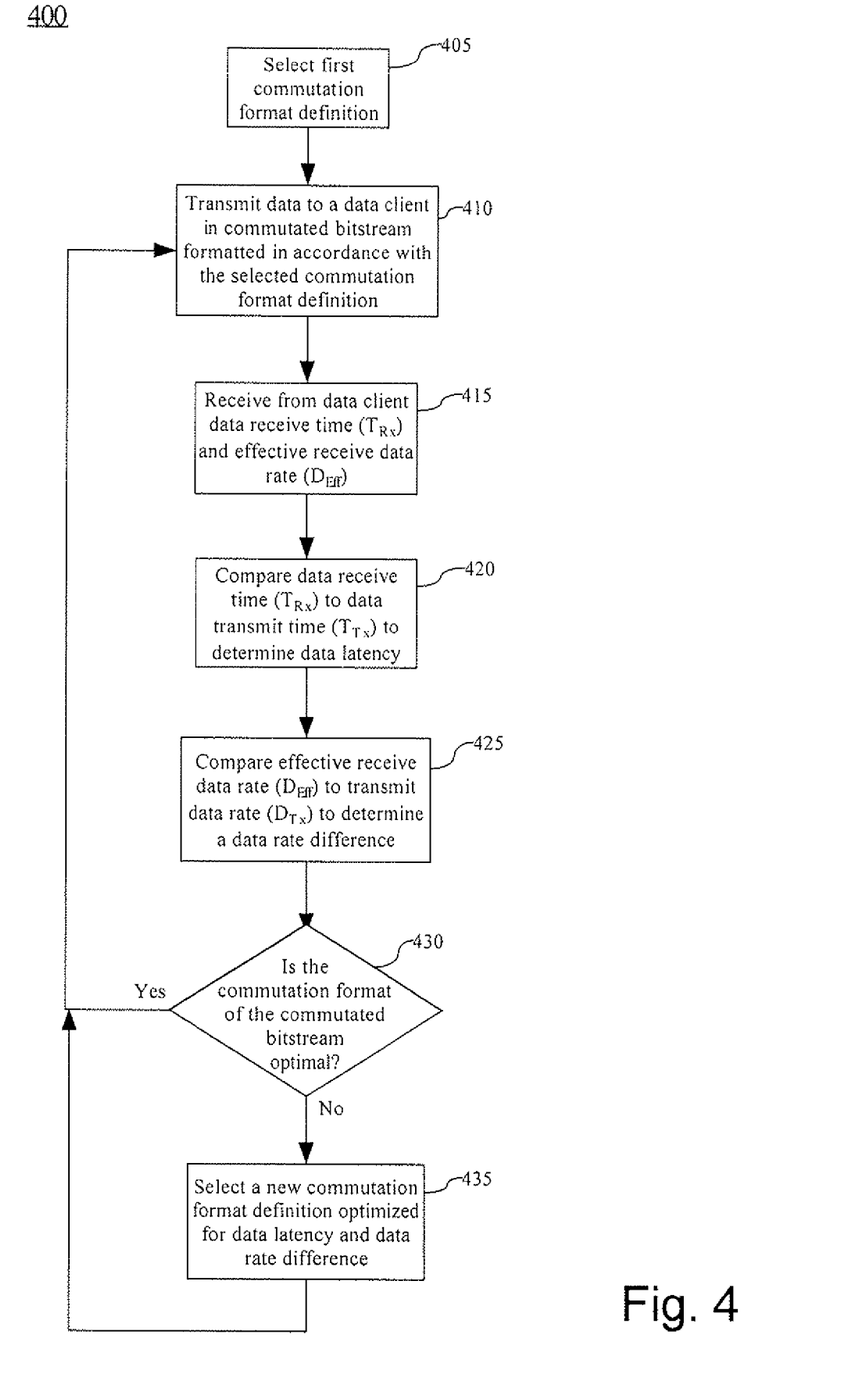
FIG. 4 is a flowchart that is useful for understanding a method of implementing adaptive bandwidth utilization.

A flowchart is shown in FIG. 4 that presents a method 400 for providing adaptive and predictable bandwidth utilization when transmitting data in a commutated bitstream. As illustrated therein, the method 400 can include several steps. Beginning at step 405, a first commutation format definition can be selected. Continuing to step 410, the data can be transmitted over a communications network to a data client in a commutated bitstream formatted in accordance with the selected commutation format definition. The data client can determine receive parameters such as the data receive time ($T_{Rx}$) and/or the effective receive data rate ($D_{\mathit{Eff}}$), and return one or both of the parameters as communication parameters. Proceeding to step 415, the data receive time ($T_{Rx}$) and/or the effective receive data rate ($D_{\mathit{Eff}}$) parameters can be received from the data client.

For example, referring to step 420, the data receive time ($T_{Rx}$) can be compared to the data transmit time ($T_{Tx}$) to determine data latency. At step 425, the effective receive data rate ($D_{\mathit{Eff}}$) can be compared to the transmit data rate ($D_{Tx}$) to determine a data rate difference. Continuing to decision box 430, if the commutation format of the commutated bitstream is optimal, further data can be transmitted to the data client using the commutation format definition already selected, as shown in step 410. However, if the commutation format of the commutated bitstream is not optimal, a new commutation format definition optimized for the data latency and rate difference can be selected, as shown in step 435. At step 410, further data can be transmitted using the new commutation format definition. The process can continue while the communication session remains active.

Figure 5:
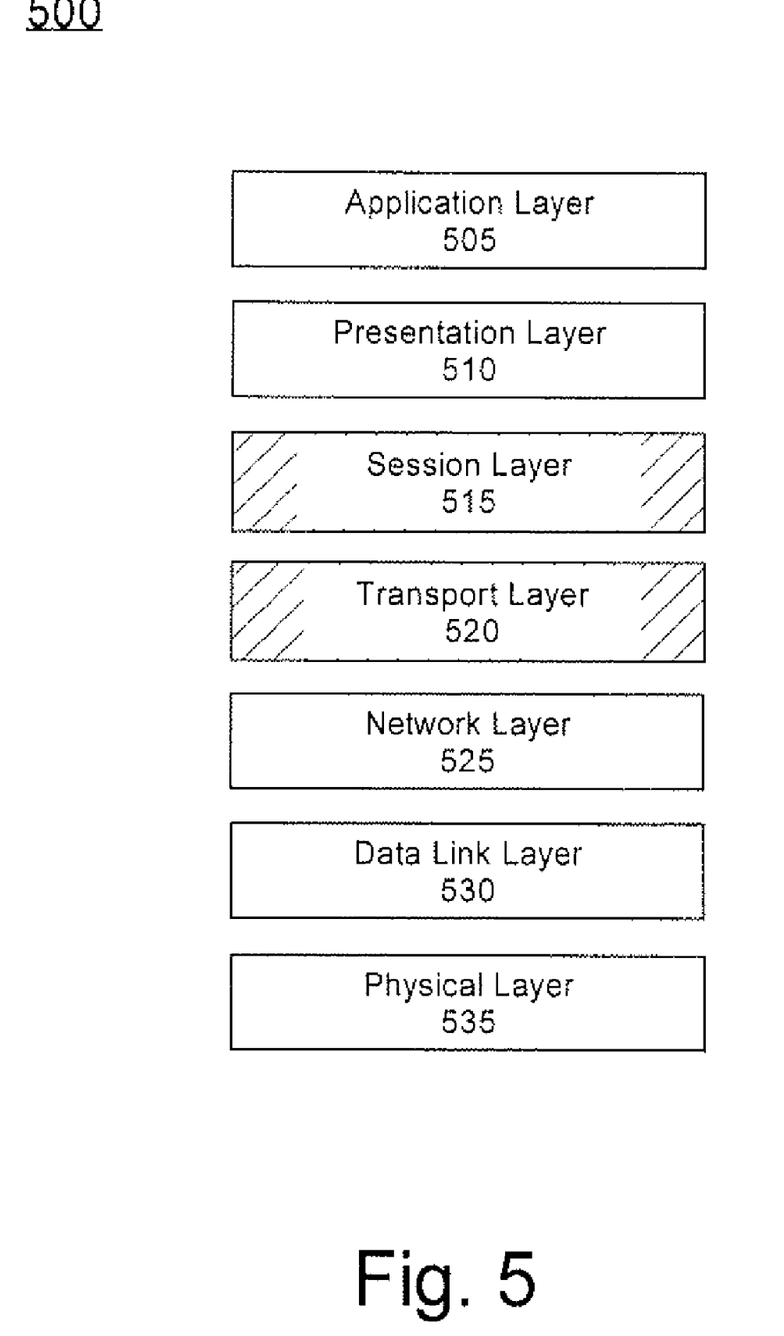
FIG. 5 is a diagram depicting layers of the open systems interconnection (OSI) standard which are useful for understanding the method of the present invention.

Referring to FIG. 5, a diagram is shown depicting the seven layers 500 of the open systems interconnection (OSI) standard which can be used to define the structure of the communications network in which the aforementioned method is implemented. The seven layers 500 can include an application layer 505, a presentation layer 510, a session layer 515, a transport layer 520, a network layer 525, a data link layer 530 and a physical layer 535. Notably, the method can be implemented in a layer that is above the network layer 525. For example, the method can be implemented in the session layer 515 and/or in the transport layer 520. Accordingly, the present invention is independent of the network protocol or network hardware that is being used, and therefore can be implemented in existing communications networks without requiring changes to the network hardware or software.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

We claim:

1. A method for optimizing bandwidth utilization in a communications network comprising:
   responsive to a measurement of at least one communication parameter of a commutated bitstream which is transmitted from a data source to a data client, determining a data rate difference;
   based on the data rate difference, selecting a new commutation format definition which defines a position of data items in the commutated bitstream and a number of bits allocated to each said data item; and
   formatting the commutated bitstream with the new commutation format definition,
   wherein the at least one communication parameter comprises an effective receive data rate (Deff) of the commutated bitstream measured by said data client, and wherein the data rate difference is determined by comparing the effective receive data rate (Deff) to a transmit data rate (Dtx) measured by said data source.

2. The method according to claim 1, wherein the at least one communication parameter further comprises a data receive time ($T_{Rx}$), wherein the method further comprises comparing the data receive time ($T_{RX}$) to a data transmit time ($T_{Tx}$) to determine a data latency, and wherein the step of selecting further comprises selecting the new commutation format based on the data latency.

3. The method according to claim 1, further comprising defining the formatting step to occur in at least one open systems interconnection (OSI) layer selected from a group consisting of a session layer and a transport layer.

4. The method according to claim 1, further comprising the step of receiving the at least one communication parameter as telemetry.

5. A data source comprising:
   a commutation engine that, in response to a measurement of at least one communication parameter of a commutated bitstream, determines a data rate difference, selects a new commutation format definition based on the data rate difference, and formats the commutated bitstream with the new commutation format definition;
   wherein the at least one communication parameter comprises an effective receive data rate (Deff) of the commutated bitstream measured by a data client, and wherein the data rate difference is determined by comparing the effective received data rate (Deff) to a transmit data rate (Dtx) measured by said data source; and wherein said new commutation format definition defines a position of data items in the commutated bistream and a number of bits allocated to each said date item.

6. The data source of claim 5, wherein the at least one communication parameter further comprises a data latency, and wherein the commutation engine is further configured to select the new commutation format definition based on the data latency.

7. The data source of claim 5, further comprising a processor for changing the commutation format using at least one open systems interconnection (OSI) layer selected from a group consisting of a session layer and a transport layer.

8. The data source of claim 5, further comprising means for receiving the at least one communication parameter from the data client as telemetry.

9. A communications network comprising:
   a data source comprising a commutation engine; and
   a data client comprising a decommutation engine;
   wherein the decommutation engine measures at least one communication parameter of a commutated bitstream received from the data source and transmits the at least one communication parameter to the data source, wherein the at least one communication parameter comprises an effective receive data rate (Deff) of the commutated bitstream;
   wherein responsive to receiving the at least one communication parameter, the commutation engine compares an effective received data rate (Deff) to a transmit data rate (Dtx) measured by said decommutation engine to determine a data rate difference, selects a new commutation format definition based on the data rate difference, and formats the commutated bitstream with the new commutation format definition; and
   wherein said new commutation format definition defines a position of data items in the commutated bitstream and a number of bits allocated to each said data item.

10. The communications network of claim 9, wherein the at least one communication parameter further comprises a data latency, and wherein the commutation engine is further configured to select the new commutation format definition based on the data latency.

11. The communications network of claim 9, wherein the data source further comprises a processor for changing the commutation format definition using at least one open systems interconnection (OSI) layer selected from a group consisting of a session layer and a transport layer.

12. The communications network of claim 9, wherein the data source further comprises means for receiving the at least one communication parameter from the data client as telemetry.

* * * * *